United States Patent [19]

Wada

[11] Patent Number: 5,269,191
[45] Date of Patent: Dec. 14, 1993

[54] MEASURING TUBE FOR USE WITH ELECTROMAGNETIC FLOWMETER

[75] Inventor: Ichiro Wada, Yokohama, Japan
[73] Assignee: Kabushiki Kaisha Toshiba, Kawasaki, Japan
[21] Appl. No.: 869,964
[22] Filed: Apr. 17, 1992

[30] Foreign Application Priority Data

Apr. 18, 1991 [JP] Japan .................................. 3-086848

[51] Int. Cl.⁵ .............................................. H01F 41/02
[52] U.S. Cl. .................................... 73/861.12; 73/861.11
[58] Field of Search ............ 73/861.12, 861.13, 861.14, 73/861.15, 861.16, 861.17; 310/11

[56] References Cited

U.S. PATENT DOCUMENTS

| | | | |
|---|---|---|---|
| 2,800,016 | 7/1957 | Sturgeon | 73/861.12 |
| 2,949,551 | 8/1960 | Sturgeon | 310/11 |
| 3,171,990 | 3/1965 | Bennett | 310/11 |
| 3,180,144 | 4/1965 | Bennett | 73/861.12 |
| 3,486,376 | 12/1969 | Wada | 73/861.12 |
| 4,269,071 | 5/1981 | Wada | 73/861.12 |
| 4,899,593 | 2/1990 | Inami et al. | 73/861.12 |
| 4,912,838 | 4/1990 | Goto et al. | 73/861.12 |

*Primary Examiner*—Richard E. Chilcot, Jr.
*Assistant Examiner*—R. Biegel
*Attorney, Agent, or Firm*—Oblon, Spivak, McClelland, Maier & Neustadt

[57] ABSTRACT

An electromagnetic flowmeter characterized by comprising a measuring tube through which fluid flows, a pair of electrodes installed to a wall surface of the measuring tube so as to face each other, electrode mounting holes of a funnel shape made at a specified angle in an inside wall surface where the electrodes are installed so as to face each other, packing that has a tilt angle different from that of the funnel-shaped portion of the electrode mounting hole and that has a penetration in its center which allows an insertion of the electrode, an elastic member installed to one end of the electrode for pulling the electrode in a longitudinal direction with a particular force and giving & particular elasticity to the electrode, and a fastening member for fastening the electrode to the measuring tube with a screw via the packing.

11 Claims, 6 Drawing Sheets

MEASURING TUBE FOR USE WITH ELECTROMAGNETIC FLOWMETER

BACKGROUND OF THE INVENTION

1. Field of the Invention

This invention relates to an electromagnetic flowmeter for measuring the velocity or the amount of flow of various fluids, and more particularly to an electromagnetic flowmeter with an improved electrode mounting structure suited for a ceramic measuring tube or a plastic measuring tube.

2. Description of the Related Art

To meet the recent demands for better insulating properties, higher chemical resistance, and high-temperature use, electromagnetic flowmeters with a ceramic measuring tube for conductive fluid have been developed. Use of such a ceramic measuring tube, however, requires particular attention to the sealing of its electrode.

Some electromagnetic flowmeters with an improved mounting structure have been proposed with a view to fulfilling the foregoing demands.

Figure 8:
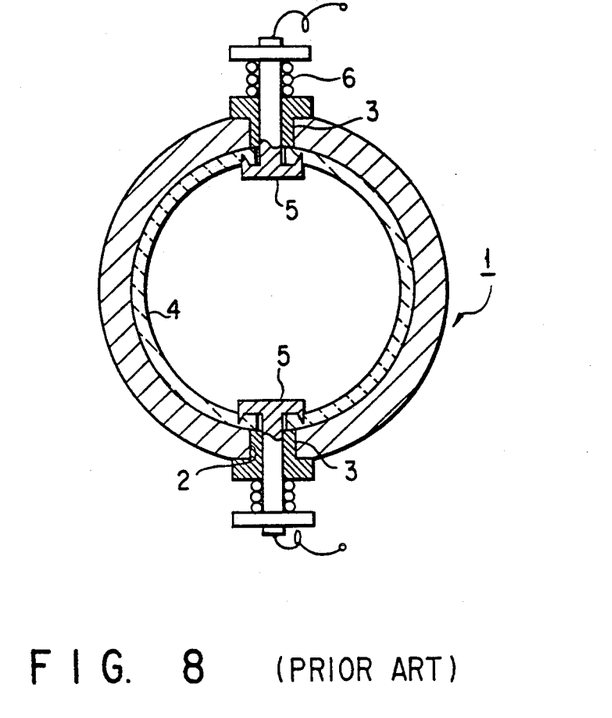
FIG. 8 is a sectional view showing the electrode structure of a conventional electromagnetic flowmeter.

For one flowmeter, as shown in FIG. 8, electrode mounting holes 2 of a specified diameter are made in the ceramic measuring tube 1 on the center line, each on opposite sides of the tube. Externally fitted into each electrode mounting hole 2 is an insulating bush 3 whose cross section is shaped like a "T". Over the inside surface of the ceramic measuring tube 1, a Teflon lining 4 of a specified thickness is formed. An electrode 5 whose cross section takes the form of an anchor (hereinafter, referred to as the anchor-shaped electrode) is inserted in the bush 3, penetrating the Teflon lining 4 from inside the tube 1. The anchor-shaped electrode 5 is installed so that its top end may bite into the Teflon lining 4 with its bottom end locked in position with a screw via an elastic member 6. The elastic member 6 is normally pulling the electrode 5 toward the inside of the measuring tube 2. This ensures that the electrode 5 is tightly sealed with the biting of the electrode top end into the Teflon lining 4 and the bush 3.

Figure 9:
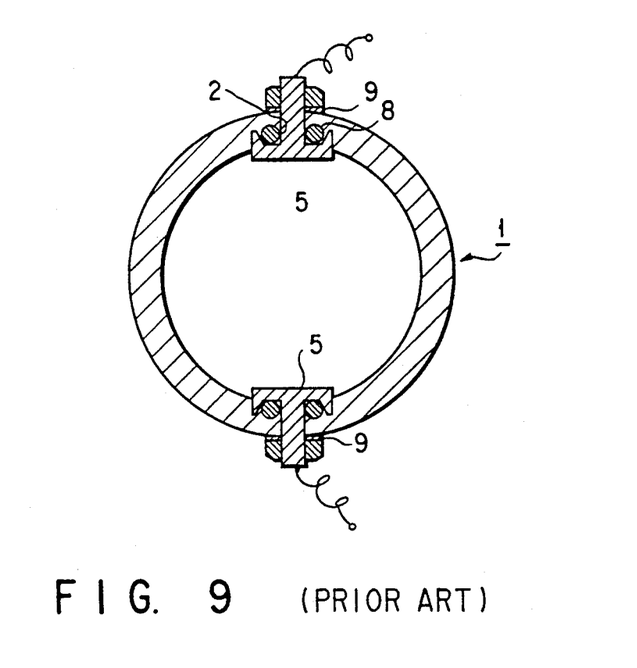
FIG. 9 is a sectional view showing another electrode structure of a conventional electromagnetic flowmeter.

For another flowmeter, as shown in FIG. 9, there are electrode mounting holes 2 of a specified diameter in the ceramic measuring tube 1 on the center line, each on opposite sides of the tube. Concave portions are formed around the periphery of each electrode mounting hole 2 inside the ceramic measuring tube 1. The anchor-shaped electrode 5 is inserted in each electrode mounting hole 2 from inside the measuring tube 1 via an O ring packing 8. The bottom end of the electrode 5 is locked in place with a screw via a spring 9. Thus, this electrode mounting arrangement is such that the measuring tube 1 is kept sealed only by the thickness of the tube 1 and the O ring packing 8.

of the aforementioned electromagnetic flowmeters, the FIG. 8 flowmeter permits the biting portion of the anchor-shaped electrode 5 and the corresponding bitten portion of the Teflon lining 4 to abrade, resulting in a degraded sealing. A fluid containing sand or gravel also wears out the electrode 5, raising a similar problem of losing sealing capabilities.

In the case of an electromagnetic flowmeter with an O ring packing 8, from the viewpoint of installation of the O ring packing 8 and better sealing properties, it is necessary to use an expensive, thick-walled ceramic measuring tube 1 or a reinforced plastic tube (such as, a plastic measuring tube reinforced with boron, carbon, or glass fiber). Since ceramic is brittle, there is a possibility that the vibration of the electrode top end and other factors damage the ceramic.

Singer unsigned ceramic creates pores at the surface of the ceramic often leading to a bad surface condition. To remove such a pore scattering layer, it has been a common practice to grind or chemically polish that portion thoroughly. Ceramic, however, has the disadvantage of being not only brittle but also easily broken at the portions where it is in contact with the electrode. In addition, grinding can create fine hair cracks, which might develop into breakage due to expansion when a large fluid pressure is applied in practical use.

SUMMARY OF THE INVENTION

The object of the present invention is to provide an electromagnetic flowmeter with a mounting structure capable of well maintaining sealing against wear of the electrode and packing due to deterioration with age, and of preventing a ceramic measuring tube from suffering damage.

To achieve the foregoing object, electromagnetic flowmeter of the present invention is, for example, constructed as follows. Funnel-shaped electrode mounting holes are made in the inside wall of a ceramic measuring tube, each hole on opposite sides of the tube. Electrodes, whose packing contact surface has a tilt angle different from that of the electrode mounting hole, are inserted into those holes via elastic packing. The bottom end of the electrode is locked in place with a screw via an elastic member such as a spring. This arrangement not only gives specified elasticity to the electrodes, but also resists a vacuum exerted in the opposite direction of the fluid pressure.

The tilt angle of the packing contact surface of the electrode is made greater than that of the funnel-shaped inclined plane of the electrode mounting hole, in order to increase the resistance to the forcing out of the packing. The packing is formed so as to have a shape and size that completely fills the space between the funnel-shaped inclined plane of the electrode mounting hole and the packing contact surface of the electrode. It is also formed to a specified thickness so as to keep the outermost periphery of the electrode mounting hole away from the packing contact surface of the electrode.

The detailed mounting structure associated with an electromagnetic flowmeter and measuring tube of this invention is as follows. For example, an electrode, whose packing contact surface has a tilt angle greater than that of funnel-shaped portion, is inserted in each funnel-shaped electrode mounting hole in the ceramic measuring tube via packing with a small clearance. This arrangement increases the resistance to the forcing out of the packing. The packing is placed so as to completely fill the space between the funnel-shaped inclined plane of the electrode mounting hole and the packing contact surface of the electrode. Giving elasticity to the electrode by means of an elastic member such as a spring prevents the electrode from directly hitting the hole in part, thereby avoiding damage to the ceramic measuring tube. Sealing is well maintained even after wear of the packing and electrode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will be explained, referring to the accompanying drawings.

Figure 1:
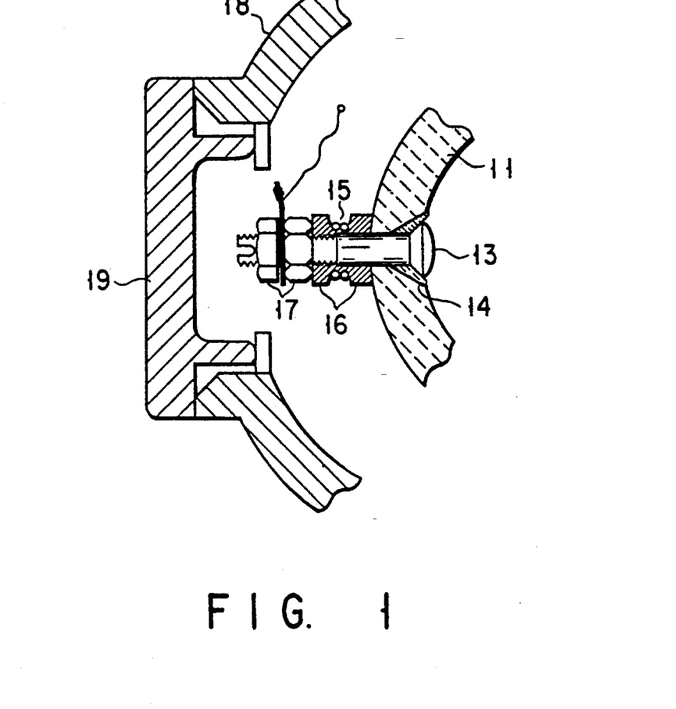
FIG. 1 is a view showing the electrode mounting structure of an electromagnetic flowmeter according an embodiment of the present invention.
Figure 2A:
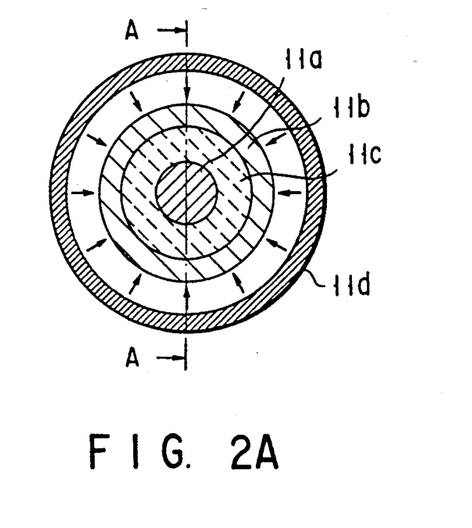
FIG. 2A is a transverse sectional view of the ceramic measuring tube formed by isostatic-press.
Figure 2B:
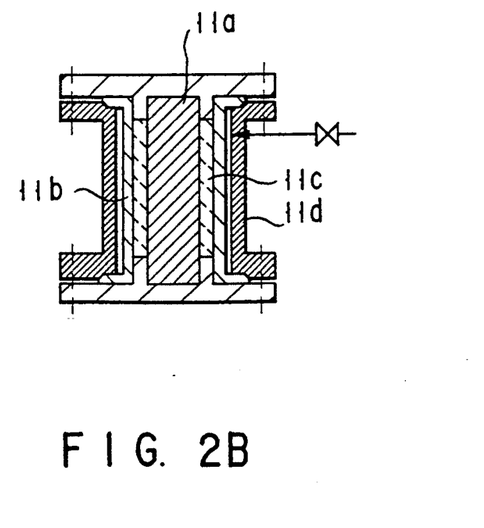
FIG. 2B is a longitudinal sectional view of the ceramic measuring tube in FIG. 2A.

The sectional view of FIG. 1 illustrates the structure of the electrode mounting portion of a ceramic measuring tube. A ceramic measuring tube 11 is produced by, for example, the following manufacturing method. FIG. 2A is a transverse sectional view of a primary portion. FIG. 2B is a longitudinal sectional view taken along line A—A of FIG. 2A.

(1) First, the outside of a metal cylinder 11a of a desired diameter is covered with an elastic tube 11b made of, for example, rubber, so that a space of a specified thickness may be formed between them.

(2) Then, the space between the metal cylinder 11a and elastic tube 11b is filled with a mixture 11c of ceramic fine powder with water-soluble binder or oil-soluble binder. For water-soluble binder, polyvinyl alcohol water solution or polyvinylacetate water solution may be used. For oil-soluble binder, polyvinyl butyral solution dissolved in an organic solvent mainly composed of methyl ethyl ketone may be used.

(3) Next, a metal tube lid is placed outside the elastic tube 11b so that the former may cover the latter to form a specific space between them.

(4) After this, by filling the space between the elastic tube 11b and metal tube 11d with, for example, a liquid to apply a specified pressure to the elastic tube 11b, the mixture 11c is solidified by hydrostatic press, followed by removal from the mold.

Figure 3A:
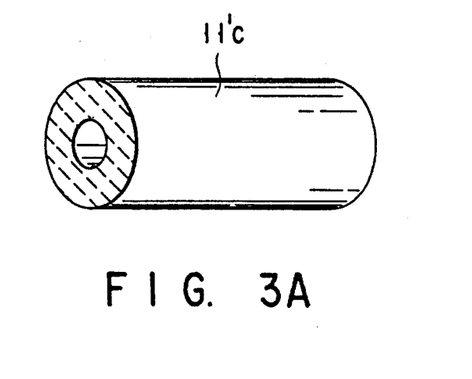
FIGS. 3A to 3E are views used to explain the manufacturing procedures of the ceramic measuring tube in green stage.

As a result of these processes unsintered ceramic using water-soluble binder is formed as hard as chalk, as shown in FIG. 3A. In contrast, use of polyvinylbutyral solution as oil-soluble binder provides flexibility depending on the amount of the remaining is organic solvent.

After the green ceramic measuring tube 11c' has been made through steps (1) to (4), the following processes will be carried out.

Figure 3B:
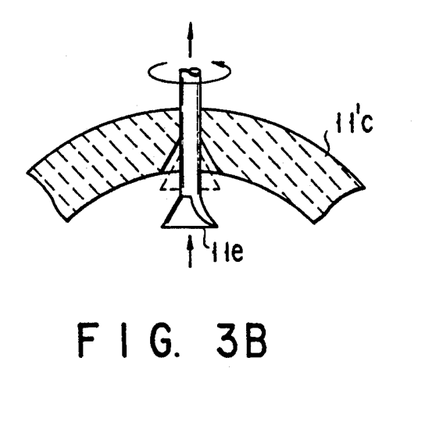
Figure 3C:
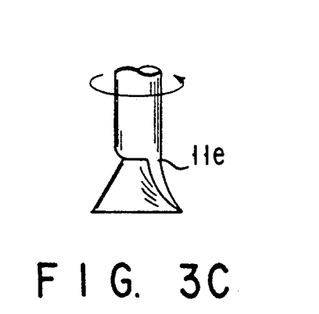
Figure 3D:
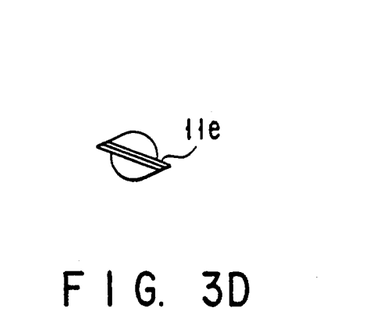
Figure 3E:
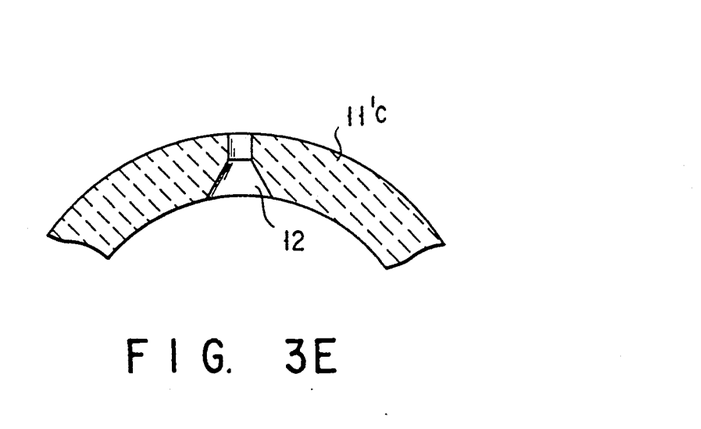

(5) In the unsintered state as shown in FIG. 3B, a chit drill 11e is inserted from inside the measuring tube 11c' and secured to a machine tool, which couterbores the tube by rotating the chit drill 11e. FIG. 3C is a schematic drawing of the chit drill 11e, and FIG. 3D shows the chit drill of FIG. 3C viewed from the bottom. By counter boring with such a chit drill 11e, a funnel-shaped electrode mounting hole 12 is formed in green stage.

(6) After the above formation is complete, the green ceramics is sintering. In the calcining process, the green ceramics is generally baked at 200° C. to 300° C. to remove the binder from the ceramic, and then is calcined at nearly 1000° C. to 1800° C., depending on the type of ceramic. Since the linear shrinkage factor of green ceramic varies with sintering temperature, the size of the funnel-shaped electrode mounting hole 12 is determined in advance in an uncalcined state. In general, however, the absolute dimensions of the calcined funnel-shaped electrode mounting hole is difficult to estimate exactly. In addition to this, its surface condition is not always good, often resulting in shear droop (continuous unevenness) in the inclined plane of the funnel-shaped mounting hole 12. Furthermore, the ceramic has the disadvantage of being easily broken due to partial hitting by the electrode 13, because the funnel-shaped electrode mounting hole 12 of brittle ceramic has the aforementioned surface condition after sinter.

When uncalcined ceramics is calcined, pores generally appear at the surface of the ceramic. To remove such a pore scattering layer, it has been a common practice that portion is ground thoroughly, followed by chemical polishing. The present invention, however, improves the conventional method of sintering the unsintered ceramics, inevitably followed by grinding.

Specifically, in the case of a ceramic measuring tube, its thin-walled portion alone is worked into a specified form only in the unsintered state. After sinter, however, grinding is not done on the funnel-shaped electrode mounting hole 12, particularly its inclined plane. With the unevenness on the surface left as it is, the space between the electrode 13 to be installed and the wall is filled with the packing 14. As a result, fine hair cracks mainly caused by extra grinding will not develop, preventing crack-caused breakage from taking place due to expansion even when a large fluid pressure is applied in practical use.

Figure 4:
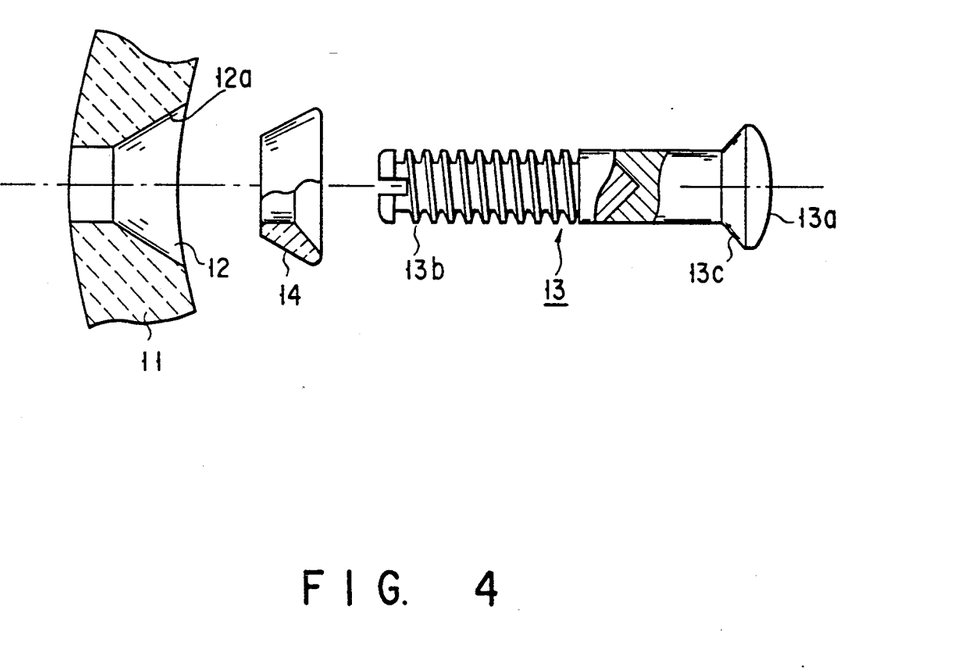
FIG. 4 is an exploded view of an electrode mounting hole, packing, and electrode.

In the present invention, the electrode mounting structure shown in FIGS. 1 and 4 is employed for installation of the electrode 13 used with the above-described ceramic measuring tube 11. Specifically, the electrode 13 is formed so that its electrode head 13a may be shaped almost like a fan with threads 13b formed near its bottom end. The tilt angle of the sides of the electrode head 13a, or the packing contact surface 13c, is characterized by being more acute than that of the funnel-shaped inclined plane 12a of the electrode mounting hole 12, with respect to the center line of the electrode.

The electrode 13 of the aforesaid shape is inserted into the funnel-shaped electrode mounting hole 12. In this case, the insertion is made via the packing of rubber or Teflon as shown in FIG. 4. A guide washer 16, which supports the elastic member 15, is fitted to the electrode 13 from outside the ceramic measuring tube 11. Finally, the bolt nut 17 is tightened to a suitable position to give particular elasticity to the electrode 13. A coil spring may be used as the elastic member installed to the bottom end of the electrode. This structure is used not only to give particular elasticity to the electrode, but also to resist the vacuum exerted in the opposite direction of the pressure from the fluid. A casing 18 is provided to protect the ceramic measuring tube 11 and other components. A lid 19 is provided for installation of the electrode 13 or for maintenance purposes.

Figure 5A:
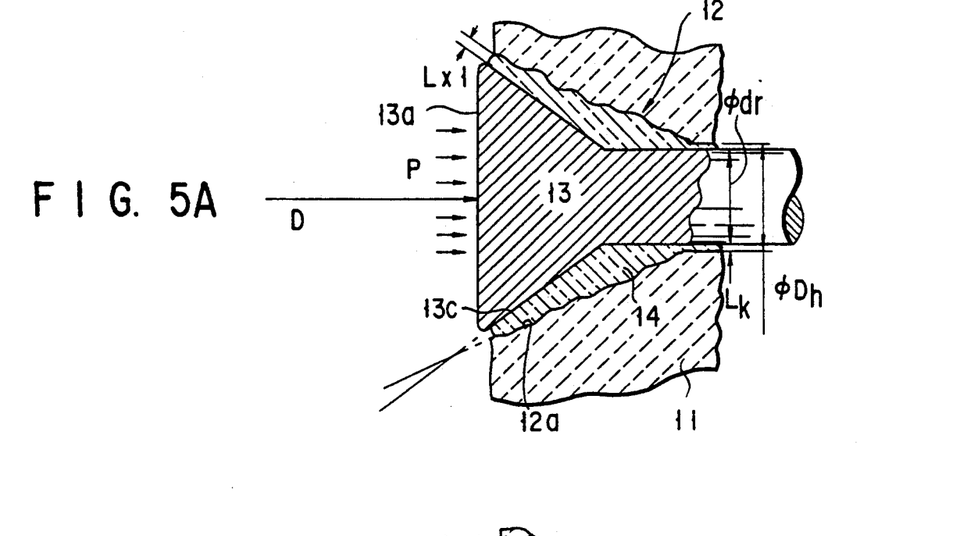
FIGS. 5A to 5C are sectional views used for explaining an electrode mounting hole, packing, electrode mounting angle, and mounting location.
Figure 5B:
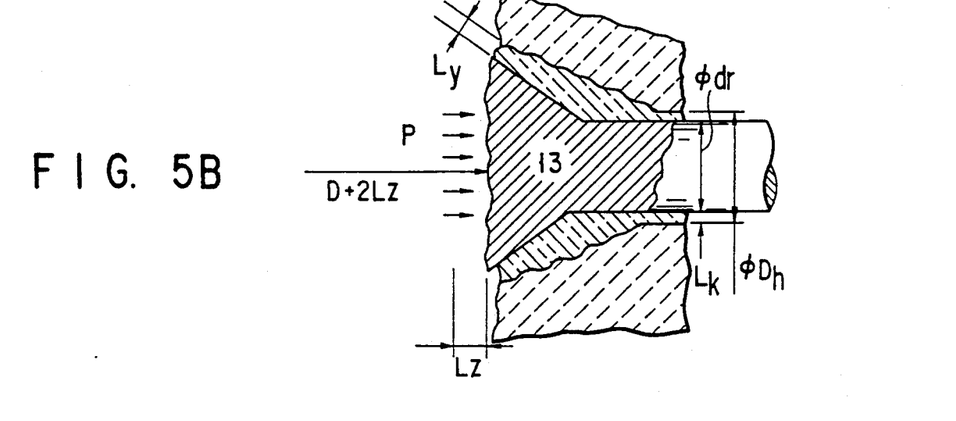
Figure 5C:
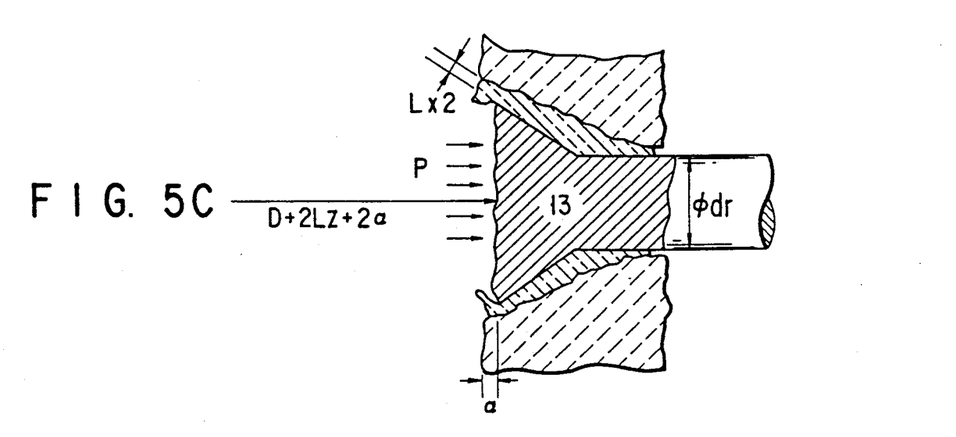

After the electrode 13 has been inserted in the funnel-shaped electrode mounting hole 12 and clamped in place with the bolt nut 17, the funnel-shaped electrode mounting hole 12, electrode 13, and packing 14 has the joining relationship between them as shown in FIGS. 5A to 5C.

Before the liquid contacting surface of the electrode has been worn out, it is normally in the state as shown in FIG. 5A. Under a high pressure P of the fluid to be measured, the inside surface of the ceramic measuring tube is worn out as shown in FIG. 5C. The packing forced out of the filled portion due to the resultant force of the high pressure P and the tension of the elastic member (not shown) such as a spring to pull up the electrode in the direction of the high pressure against the vacuum, if any. FIG. 5B shows Ly of the gap in the course of deterioration with age. The Ly finally reaches what is called the self-balanced gap $Lx2$ as shown in FIG. 5C. Specifically, the width of the gap is $Lx1$ before wear, changes to Ly in an intermediate wearing state, and after wear, reaches $Lx2$ where it is balanced. Thus, even after the electrode or ceramic has been worn out, it is held in place in a balanced position, assuring tight sealing of the space between the electrode and ceramic.

Before wear, D (electrode distance) remains constant, causing no errors in the electrode position (FIG. 5A). Even when there is wear which would cause leakage in a conventional electrode structure, the structure of the present invention constantly seals the gap, causing no leakage (FIG. 5C). As a result, it is possible to prevent fluid leakage from leading to a serious failure due to deterioration with age.

As shown in FIG. 5C, when excessive wear takes place at the electrode head as a result of being exposed to high pressures for a long time, the actual distance between opposite electrodes is expressed as:

$$D+(2Lz+2a)$$

where D is the distance between electrodes at the beginning; Lz the wear width of electrode; and a the sinking width of electrode.

As seen from the expression, the distance between two electrodes changes by $2(Lz+a)$ or $(2Lz+2a)$. Thus, it is possible to maintain the device at a high accuracy for a long time by suitably modifying each factor for calibration during periodic inspection. The gap width Lk is determined by the maximum pressure of the fluid to be measured. As the pressure is larger, the Lk can be made smaller.

With the above-described arrangement, the electromagnetic flowmeter of the present invention has the following effects.

(1) The tilt angle of the packing contact surface 13 of the electrode 13c is made larger than that of the funnel-shaped inclined plane 12a of the electrode mounting hole 12. This arrangement acts in a manner that seals the packing 14, with the result that the resistance to the forcing out of the packing 14 becomes larger, preventing the packing from being forced out.

(2) The direction of the tangent of the packing contact surface 13c is allowed to cross that of the funnel-shaped inclined plane 12a in the vicinity of or more ahead of the top end of the packing contact surface 13c. The shape and size of the packing 14 should be such that it completely fills the space between the funnel-shaped inclined plane 12a of the electrode mounting hole 12 and the packing contact surface 13c of the electrode 13. The packing contact surface 13c of the electrode 13 is placed a specified distance of Lx1 away from the outermost periphery of the electrode mounting hole 12 in the ceramic measuring tube 11. This arrangement prevents the electrode 13 from striking the measuring tube 11 in part, which avoids damage to the brittle ceramic measuring tube 11.

(3) The ceramic measuring tube 11 is often used at fluid pressures ranging from 63 kg/cm² to 200 kg/cm². Under the aforementioned conditions, the pressure exerted from the liquid contact side of the electrode changes to distributed loads at the packing portion. Those loads are transferred to the entire inside surface of the electrode mounting hole, making it easy for the structure to withstand the pressure. As a result, The distance D between two opposite electrodes remains almost unchanged, allowing the device to measure the amount of flow at higher accuracy.

(4) Use of the packing 14, which separates the packing contact surface 13c of the electrode 13 a specified distance of Lx1 away from the outermost periphery of the electrode mounting hole 12, prevents sealing properties from deteriorating. This makes it possible to operate the device properly for a long time.

The packing 14, which is placed to completely fill the space between the funnel-shaped inclined surface 12a of the electrode mounting hole 12 and the packing contact surface 13c of the electrode 13, sometimes loses its elasticity and creates a flow due to its thermal expansion. To avoid this, the guide washer 16 supporting the elastic member 15 is installed to the bottom end of the electrode to give a particular elasticity to the electrode 13.

(5) The mounting structure capable of preventing damage to the ceramic measuring tube and the elimination of unnecessary grounding make it possible to provide a low-cost electromagnetic flowmeter manufactured through a smaller number of assembly and processing stages.

Figure 6:
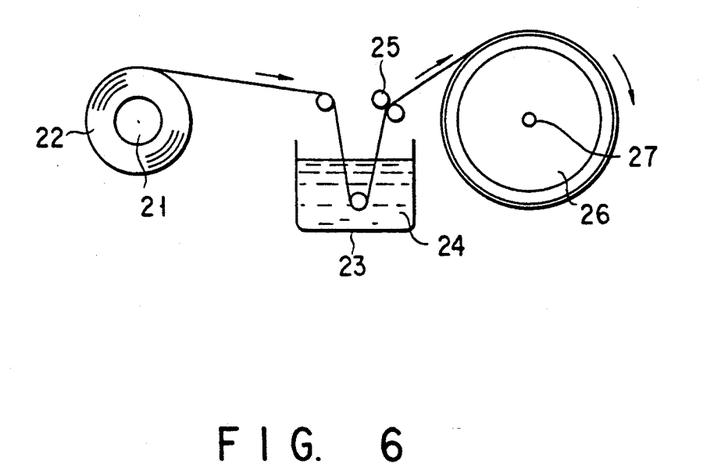
FIG. 6 is a view showing the assembly of cloth reinforced plastics.
Figure 7:
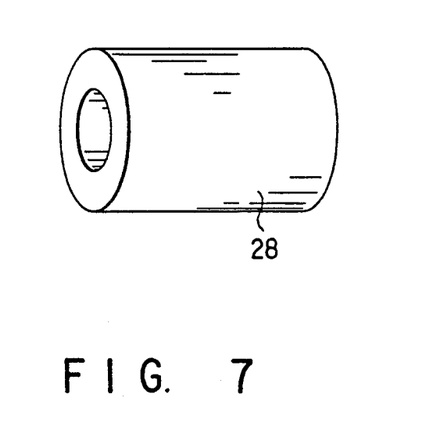
FIG. 7 is a perspective view of a resin pipe manufactured by the method of FIG. 6.

Fiber reinforced plastic, which may be used in place of ceramic, may be made by combining the following fibers and resins. The suitable types of fibers include boron, carbon, and glass. The preferable types of resins include epoxy resin, polyester resin, phenol resin, and silicone resin. Fiber in the form of woven textile is made into, for example, a glass fiber reinforced epoxy resin pipe by means of a processing apparatus as shown in FIG. 6. Specifically, cloth 22 (of boron, carbon, or glass) wound around the bobbin core 21 is sequentially immersed in an uncured resin 24 in the resin tank 23. Extra resin is pressed the roller 25 on the output side and is wound around the mandrel (mold) 26 with a certain tension. After the thickness of the wound textile around the mandrel has reached a specified value, the textile together with the mandrel is put in a heating furnace for hardening. For cold-setting resin, heating is not necessary. The mandrel 26 has a rotating shaft 27. After hardening is complete, the mandrel 26 is removed to form a resin pipe as shown in FIG. 7. Instead of cloth, such a pipe may be made using fiber by filament winding techniques.

The FRP made by the above method has funnel-shaped holes into which electrodes are inserted, like a ceramic pipe. Those holes may be made by means of a chit drill or by molding resin. Concentrated stress exerted on the electrode portion introduces a chalking phenomenon ("craze") where textile layers or fibers peel off, which makes it possible for the pressure to be transferred in the form of distributed stresses. This manufacturing method may apply to the formation of resin pipes not containing filaments of polypropylene, polyethylene, or polyvinyl chloride. The pipe thus produced has distributed stresses, making it harder for cracks to develop.

The present invention is not limited to the above embodiment. For example, the material of the measuring tube 11 is not restricted to ceramic or plastic. Its manufacturing method is not limited to one described earlier. The shape of the electrode head 13a is not restricted only to a fan. For instance, it may have a triangular cross section as shown in FIG. 5A. The electrode 13 may be made from any other material as long as it meets the requirements sufficiently.

The present invention may be practiced or embodied in still other ways without departing from the spirit or essential character thereof.

With the present invention, it is possible to provide an electromagnetic flowmeter with an electrode mounting structure for a measuring tube, which not only prevents damage to, for example, a ceramic measuring tube or a plastic measuring tube, but also maintains sufficient sealing at the space between the electrode and the hole in which the electrode is installed even after wear of the electrode and packing due to deterioration with age.

Additional advantages and modifications will is readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A measuring tube for use with an electromagnetic flowmeter, comprising:
    at least one electrode having an outwardly tapering head portion installed in a wall surface of said measuring tube;
    electrode mounting holes having a funnel-shaped portion which opens toward an interior of said measuring tube;
    a packing positioned in said electrode mounting hole and having a penetration at its center for permitting an insertion of said electrode, a first interface between said funnel-shaped portion of said electrode mounting hole and said packing defining a first cone angle, with respect to a longitudinal axis of said electrode mounting hole, and a second interface between the packing and the tapering head portion of the electrode defining a second cone angle, with respect to the longitudinal axis of said electrode mounting hole, which is different than said first cone angle;
    an elastic member installed to one end of said electrode for pulling said electrode in a longitudinal direction with a force; and
    a fastening member for fastening said electrode to said measuring tube via said packing.

2. The measuring tube for use with an electromagnetic flowmeter according to claim 1, wherein the second cone angle is greater than the first cone angle for increasing a resistance to a forcing out of the packing from a space between said electrode and said measuring tube.

3. The measuring tube for use with an electromagnetic flowmeter according to claim 1, wherein said packing defines a predetermined shape, size, and elasticity that, when said electrode is installed to it, completely fills a space between the funnel-shaped portion of said electrode mounting hole and the tapering head portion of said electrode.

4. The measuring tube for use with an electromagnetic flowmeter according to claim 1, wherein said packing comprises a sufficient thickness for allowing a periphery of said electrode mounting hole to be always kept separate from a fan-shaped side of said electrode.

5. The measuring tube for use with an electromagnetic flowmeter according to claim 2, wherein said elastic member provides a force to said packing for completely filling said space, and promotes an escape of said packing itself by thermal expansion.

6. A measuring tube for use with an electromagnetic flowmeter having an electrode mounting structure which comprises:
    at least a pair of electrodes having outwardly tapering head portions installed to said measuring tube so as to face each other, with electrode mounting holes having a funnel shape portion which opens toward an interior of said measuring tube made in an inside wall surface, on opposite sides, of said measuring tube, where said electrodes are positioned;
    a packing having a funnel-shaped inclined plane and positioned in said electrode mounting hole such that a first interface between said funnel-shaped portion of said electrode mounting hole and said packing defines a first cone angle, with respect to a longitudinal axis of said electrode mounting hole, and a second interface between the packing and the tapering head portion of the electrode defines a second cone angle, with respect to the longitudinal axis of said electrode mounting hole, which is different than said first cone angle;
    an elastic member installed to one end of said electrode passing through a center of said packing, for giving a particular elasticity to said electrode; and
    a fastening member for fastening said electrode to a wall of said measuring tube via said elastic member.

7. The measuring tube for use with an electromagnetic flowmeter according to claim 6, wherein the shape of said packing is such that it has a specified opening in its center, and has at least on one end, a funnel-shaped concave portion that mates with the tapering head of said electrode with respect to a center of said opening, wherein the second cone angle is larger than the first cone angle.

8. The measuring tube for use with an electromagnetic flowmeter according to claim 6, wherein the second cone angle is different from the first cone angle such that a wall of the funnel-shaped inclined plane of said electrode mounting hole becomes thicker as it approaches its axis; and said tapering head portion of said electrode is formed in advance so as to have a fit along the funnel-shaped inclined plane of said packing for surface contact.

9. The measuring tube for use with an electromagnetic flowmeter according to claim 6, wherein said packing defines a predetermined shape, size and elasticity that, when said electrode is installed to it, completely fills a space between the funnel-shaped portion of said electrode mounting hole and the tapering head portion of said electrode.

10. The measuring tube for use with an electromagnetic flowmeter according to claim 6, wherein said packing comprises a sufficient thickness for allowing a periphery of said electrode mounting hole to be always kept separate from a fan-shaped side of said electrode.

11. The measuring tube for use with an electromagnetic flowmeter according to claim 9, wherein said elastic member provides a force to said packing for completely filling said space, and promotes an escape of said packing itself by thermal expansion.

* * * * *